US 8,013,725 B2

(12) United States Patent
Murata et al.

(10) Patent No.: US 8,013,725 B2
(45) Date of Patent: Sep. 6, 2011

(54) TIRE PRESSURE MONITORING DEVICE

(75) Inventors: Tsuneo Murata, Suginami-ku (JP); Yuki Yamagata, Kawasaki (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/688,333

(22) Filed: Mar. 20, 2007

(65) Prior Publication Data

US 2007/0159315 A1    Jul. 12, 2007

Related U.S. Application Data

(63) Continuation of application No. PCT/JP2005/018133, filed on Sep. 30, 2005.

(30) Foreign Application Priority Data

Oct. 1, 2004   (JP) .................................. 2004-290155
Jul. 25, 2005  (JP) .................................. 2005-213973

(51) Int. Cl.
    *B60C 23/00* (2006.01)
(52) U.S. Cl. .......................... 340/447; 340/448; 340/449
(58) Field of Classification Search .................. 340/442, 340/447, 448, 438; 73/146, 146.2, 146.3, 73/146.8; 116/34 R, 34 A, 34 B
    See application file for complete search history.

(56) References Cited

U.S. PATENT DOCUMENTS

| 5,612,671 | A | 3/1997 | Mendez et al. |
| 6,064,320 | A * | 5/2000 | d'Hont et al. ................. 340/933 |
| 6,340,930 | B1 * | 1/2002 | Lin ............................... 340/447 |
| 6,407,719 | B1 * | 6/2002 | Ohira et al. .................... 343/893 |
| 6,463,798 | B2 * | 10/2002 | Niekerk et al. ............... 73/146.2 |
| 6,518,877 | B1 * | 2/2003 | Starkey et al. ............... 340/447 |
| 6,591,671 | B2 * | 7/2003 | Brown .......................... 73/146.5 |
| 6,885,293 | B2 * | 4/2005 | Okumura ..................... 340/448 |
| 6,988,026 | B2 * | 1/2006 | Breed et al. ..................... 701/29 |
| 2002/0084896 | A1 * | 7/2002 | Dixit et al. .................... 340/447 |
| 2003/0201044 | A1 * | 10/2003 | Schick ....................... 152/152.1 |
| 2004/0008108 | A1 * | 1/2004 | Kroitzsch et al. ............. 340/442 |
| 2004/0113764 | A1 * | 6/2004 | Katou .......................... 340/445 |
| 2004/0257213 | A1 | 12/2004 | Tsujita |
| 2005/0068161 | A1 | 3/2005 | Ichinose et al. |

FOREIGN PATENT DOCUMENTS

| EP | 1 542 190 A1 | 6/2005 |
| JP | 08-507735 A | 8/1996 |
| JP | 08-244423 A | 9/1996 |

(Continued)

OTHER PUBLICATIONS

Official Communication for PCT Application No. PCT/JP2005/018133; mailed on Jan. 10, 2006.

*Primary Examiner* — Travis Hunnings
(74) *Attorney, Agent, or Firm* — Keating & Bennett, LLP

(57) ABSTRACT

Pneumatic pressure monitoring units that measure pneumatic pressures of respective tires and that transmit results of the measurements of the pneumatic pressures from respective antennas by the use of radio signals are provided at the tires, respectively. A communication unit including a beam controller arranged to selectively direct reception beams towards the respective tires is provided at substantially the center near the bottom surface of a vehicle. The antennas of the respective pneumatic pressure monitoring units are constructed so that directivity patterns of transmission beams are directed towards the inside in axle directions of the tires.

11 Claims, 14 Drawing Sheets

FOREIGN PATENT DOCUMENTS

| | | |
|---|---|---|
| JP | 09-210827 A | 8/1997 |
| JP | 10-019710 A | 1/1998 |
| JP | 2003-151063 A | 5/2003 |
| JP | 2003-151064 A | 5/2003 |
| JP | 2003-226121 A | 8/2003 |
| JP | 2003-306017 A | 10/2003 |
| JP | 2004-133911 A | 4/2004 |
| JP | 2004-189034 A | 7/2004 |
| JP | 2004-301680 A | 10/2004 |
| JP | 2005-001498 A | 1/2005 |
| WO | 94/06640 A1 | 3/1994 |
| WO | 03/086787 A1 | 10/2003 |

* cited by examiner

TIRE PRESSURE MONITORING DEVICE

BACKGROUND OF THE INVENTION

1. Field of the Invention

The present invention relates to a tire pressure monitoring device that monitors the pneumatic pressure of a plurality of tires of a vehicle.

2. Description of the Related Art

A related tire pressure monitoring device is disclosed in Japanese Unexamined Patent Application Publication No. 9-210827 (Patent Document 1). In the tire pressure monitoring device disclosed in Patent Document 1, as shown in FIG. 15, pneumatic pressure monitoring units A14 are individually installed for respective tires A12, an RF receiver A18 receives pneumatic pressure data, transmitted by radio from each pneumatic pressure monitor unit A14, by one common antenna A16, and a processor A20 distinguishes between characteristic identification codes (ID) of the respective tires to determine from which pneumatic pressure monitoring unit of the tire that the data, such as the pneumatic pressure data, is received.

However, in the tire pressure monitoring device disclosed in Patent Document 1, since each ID is previously registered, such as at the time of shipment of a vehicle, when, for example, tires mounted on the vehicle are replaced with spare tires, the positions at which the respective tires that are previously registered are mounted to the vehicle change. In such a case, it is necessary to register each ID again and to match the position of each tire on the vehicle with its ID. Therefore, it is necessary to register the IDs at a dealer each time the tires are replaced, which is inconvenient to perform.

To overcome this problem, Japanese Unexamined Patent Application Publication No. 2003-226121 (Patent Document 2) discloses a technique of determining from which pneumatic pressure monitoring unit of the tire that the data, such as the pneumatic pressure data, is transmitted without requiring the ID.

In a tire pressure monitoring device disclosed in Patent Document 2, as shown in FIG. 16, a right front wheel speed sensor B6, a left front wheel speed sensor B7, a right rear wheel speed sensor B8, and a left rear wheel speed sensor B9 are provided near a right front wheel tire B1, a left front wheel tire B2, a right rear wheel tire B3, and a left rear wheel tire B4, respectively, to determine the rotational speeds of the respective wheels and transmit each item of rotational speed data to an ABS control unit B11. In addition, pneumatic pressure monitoring units B10 provided at the respective tires transmit the centrifugal forces and the pneumatic pressures of the respective tires by radio to a tire pressure warning control unit B13. The fact that the size of the swing radius of each tire is different when the vehicle turns and travels is used to determine each axle speed based on centrifugal force information of each tire when the vehicle is turning and traveling. Then, this data and a detection result of each wheel speed sensor are compared to determine the position of each tire.

However, in the tire pressure monitoring device disclosed in Patent Document 2, since the centrifugal force information of each tire is the same when the vehicle is traveling in a straight line or when the vehicle is stopped, the position of each tire cannot be specified. When a signal is received from the pneumatic pressure monitoring unit of each tire, it cannot be determined for which tire the pneumatic pressure data is.

In addition, in the tire pressure monitoring device disclosed in Patent Document 2, it is necessary to provide individual wheel speed sensors near the respective tires and to perform wire routing from the wheel speed sensors to the control unit. Therefore, the number of parts and mounting costs are increased.

SUMMARY OF THE INVENTION

To overcome the problems described above, preferred embodiments of the present invention provide a tire pressure monitoring device which monitors pneumatic pressure information of each tire without providing wheel speed sensors near respective tires and detects the centrifugal forces of the respective tires, and without referring to IDs such as those referred to in Patent Document 1.

A tire pressure monitoring device according to a preferred embodiment of the present invention includes pneumatic pressure monitoring units and a communication unit. The pneumatic pressure monitoring units are disposed at respective tires of a vehicle, measure pneumatic pressures of the tires, and transmit results of the measurements of the pneumatic pressures from antennas by using radio signals. The communication unit receives the radio signals from the pneumatic pressure monitoring units. In addition, the communication unit is disposed in the vehicle, and is provided with a beam controller arranged to selectively direct reception beams in directions of the respective tires.

In the tire pressure monitoring device, it is possible for the communication unit to, after selectively directing a transmission beam towards one of the plurality of tires and transmitting a signal to the pneumatic pressure monitoring unit of the tire, receive a signal that is transmitted from the pneumatic pressure monitoring unit of the tire.

The antennas of the pneumatic pressure monitoring units may be directional antennas with directivities toward the inside in axle directions of the tires.

Each pneumatic pressure monitoring unit may include a unit arranged to convert an electromagnetic wave into electrical power.

The unit arranged to convert an electromagnetic wave into electrical power of each pneumatic pressure monitoring unit may convert a transmission signal transmitted from the communication unit into electrical power.

The communication unit that is disposed in the vehicle can selectively direct reception beams towards the respective tires, and receive radio signals from the pneumatic pressure monitoring units provided at the respective tires. Therefore, it is not necessary to provide an ID to the radio signal from each pneumatic pressure monitoring unit. Even if an ID is provided to each radio signal, the position of each tire does not need to be determined based on the ID. Consequently, even if a tire is replaced, it is possible to determine from which tire mounted at a location of the vehicle a signal is transmitted. In addition, since it is not necessary to individually provide wheel speed sensors near the respective tires, costs are reduced.

The communication unit may selectively direct a transmission beam to one of the plurality of tires and send a signal to the pneumatic pressure monitoring unit of the tire. In this case, the communication unit receives a signal transmitted from the pneumatic pressure monitoring unit of the tire, so that, only when the signal is transmitted to the pneumatic pressure monitoring unit from the communication unit, the pneumatic pressure of the tire is measured with the pneumatic pressure monitoring unit, and data regarding the pneumatic pressure is sent to the communication unit. Accordingly, since it is not necessary to periodically measure the pneumatic pressure and transmit the pneumatic-pressure data, it is possible to reduce consumption of electrical power of the pneumatic pressure monitoring unit.

The directivity of the antenna of each pneumatic pressure monitoring unit may be towards the inside in the axle direction of the tire, so that it is possible to increase the gain of a reception signal of the communication unit provided at the vehicle. Accordingly, power consumption of each pneumatic pressure monitoring unit is reduced correspondingly, so that the life of each power supply battery is increased. In addition, unnecessary radiation to the outside of the vehicle is reduced, thereby preventing another vehicle that is traveling adjacent to the vehicle from erroneously receiving a radio signal from any of the pneumatic pressure monitoring devices of the vehicle.

Since each pneumatic pressure monitoring unit may have a unit arranged to convert an electromagnetic wave into electrical power, the battery that drives each pneumatic pressure monitoring unit can be easily charged. Therefore, it is unnecessary to replace each battery, such that each pneumatic pressure monitoring unit can be semi-permanently used.

The unit arranged to convert an electromagnetic wave into electrical power of each pneumatic pressure monitoring unit may convert a transmission signal that is transmitted from the communication unit into electrical power, so that it is possible to charge the battery of each pneumatic pressure monitoring unit. In addition, to reduce the size, it is possible to replace each battery by a capacitor and to convert a transmission electromagnetic wave from the communication unit into electrical power, so that each capacitor can be charged with the electrical power. By using the electrical power obtained in this manner, each pneumatic monitoring unit of the corresponding tire can measure pneumatic pressure of the corresponding tire and transmit pneumatic pressure data.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A tire pressure monitoring device according to a first preferred embodiment will be described with reference to FIGS. 1 to 7.

Figure 1:
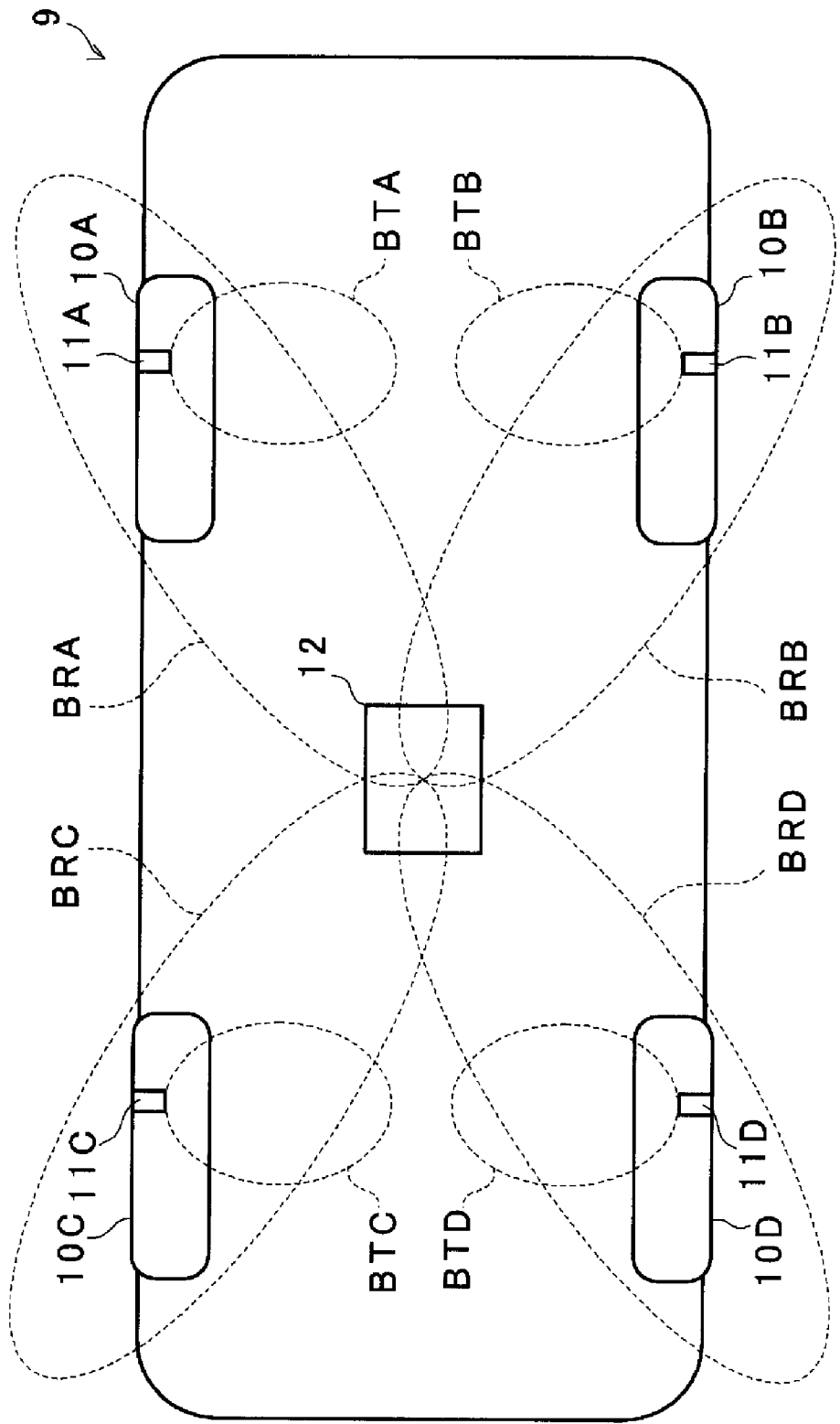
FIG. 1 is a schematic bottom view of a vehicle in which a tire pressure monitoring device according to a first preferred embodiment of the present invention is installed.

FIG. 1 is a schematic bottom view of a vehicle in which the tire pressure monitoring device is installed. Four tires 10A, 10B, 10C, and 10D are provided with pneumatic pressure monitoring units 11A, 11B, 11C, and 11D, respectively. A communication unit 12 that receives radio signals from these pneumatic pressure monitoring units 11A to 11D is disposed at substantially the center near the bottom surface of a vehicle 9.

Each of the pneumatic pressure monitoring units 11A to 11D measures pneumatic pressure and transmits by radio a result of the measurement of the pneumatic pressure. The pneumatic pressure monitoring units 11A to 11D produce respective transmission beams BTA to BTD that are directed inward in axle directions of the respective tires.

The communication unit 12 selectively produces reception beams BRA to BRD towards the four tires. For example, by directing the reception beam BRA towards the tire 10A, the communication unit 12 selectively receives the radio signal from the pneumatic monitoring unit 11A provided at the tire 10A. By directing the reception beam BRB towards the tire 10B, the communication unit 12 receives the radio signal from the pneumatic pressure monitoring unit 11B. By directing the reception beam BRC towards the tire 10C, the communication unit 12 selectively receives the radio signal from the pneumatic pressure monitoring unit 11C. By directing the reception beam BRD towards the tire 10D, the communication unit 12 selectively receives the radio signal from the pneumatic monitoring unit 11D.

Figure 2:
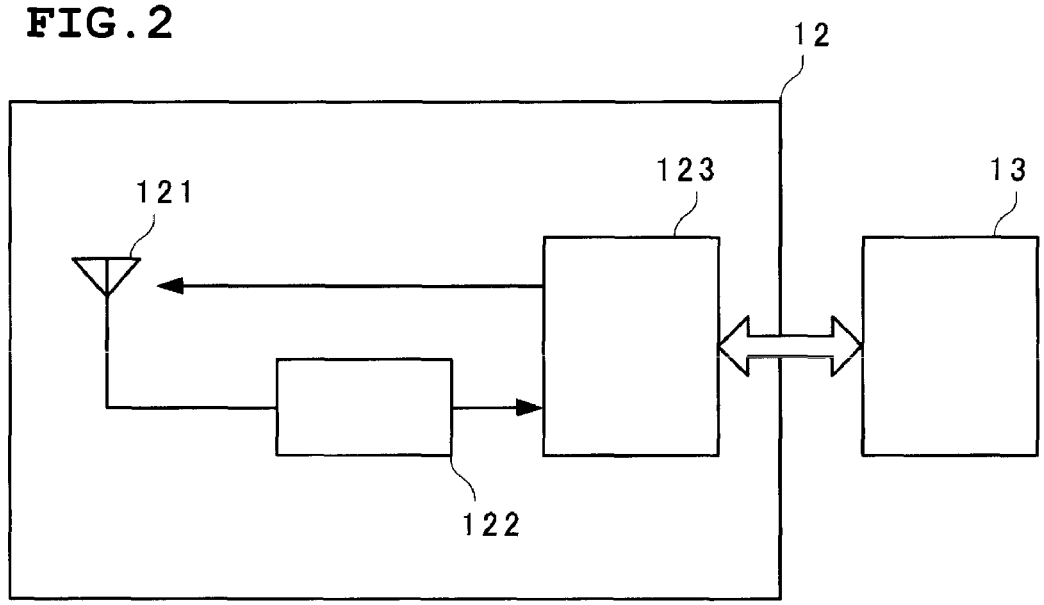
FIG. 2 is a block diagram of a structure of a communication unit of the tire pressure monitoring device.

FIG. 2 is a block diagram showing a relationship between a structure of the communication unit 12 and a host device 13 connected to the communication unit 12. The communication unit 12 includes an antenna 121 that receives the radio signals from the pneumatic pressure monitoring units, and a receiver 122 and a processor 123 thereof. The processor 123 controls the antenna 121 so that a reception beam directivity pattern becomes any one of the four reception beam directivity patterns BRA to BRD shown in FIG. 1, and reads a result of reception by the receiver 122. In addition, the processor 123 outputs pneumatic pressure information of each tire to the host device 13. Based on the pneumatic pressure information of each tire, the host device 13, for example, controls an output indicating, for example, whether or not each pneumatic pressure is within a proper pneumatic pressure range.

Figure 3A:
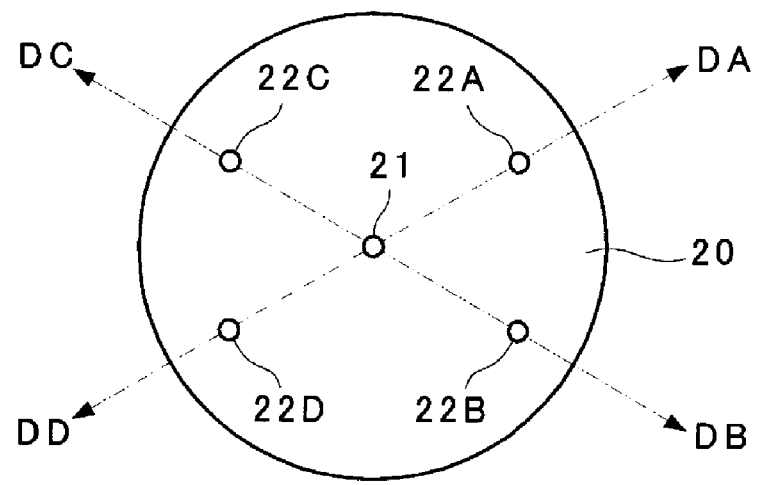
FIGS. 3A to 3C show a structure of an antenna of the communication unit.
Figure 3B:
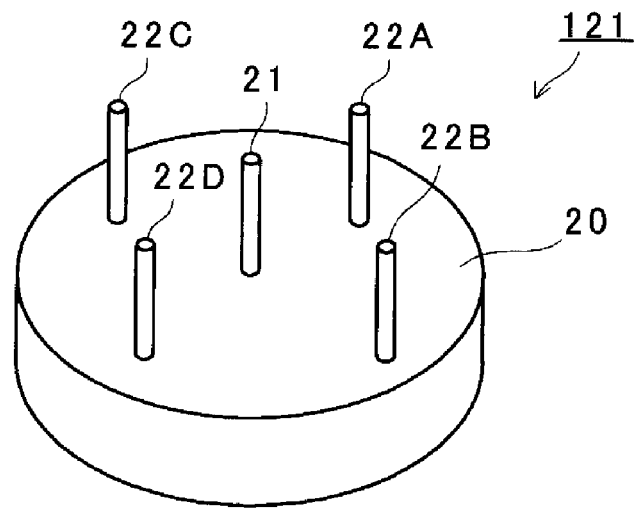
Figure 3C:
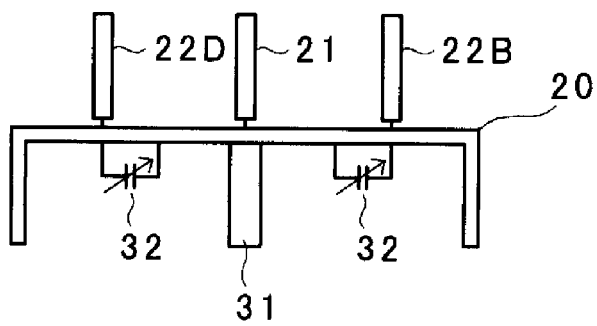

FIGS. 3A to 3C show a structure of the antenna 121 of the communication unit 12. FIG. 3A is a plan view thereof, FIG. 3B is a perspective view thereof, and FIG. 3C is a side central sectional view thereof.

A monopole power-supplying element 21 is disposed at the central portion of a grounded disc-shaped ground conductor 20. Four monopole non-power-supplying elements 22A to 22D are disposed around the power-supplying element 21. Here, directions DA to DD towards which the non-power-supplying elements 22A to 22D face from the power-supplying element 21 substantially match the directions of the centers of the respective reception beams BRA to BRD shown in FIG. 1. The directions DA and DD are opposite to each other, and the directions DB and DC are opposite to each other. The non-power-supplying elements 22A to 22D are disposed so as to be spaced from the power-supplying element 21 by approximately ¼ to ½ wavelength in a frequency band that is being used.

The ground conductor 20 has a disc-shaped portion and a cylindrical portion (skirt) extending downward from the periphery of the disc-shaped portion. In the interior of the skirt, a power supply circuit 31 is connected to the power supplying element 21. Variable reactance circuits 32 are inserted between the respective four non-power-supplying elements 22A to 22D and ground.

The ground conductor 20 is formed by forming a conductor film at the upper surface or the intermediate layer of a dielectric laminated plate formed of, for example, FR-4 or Teflon (trademark) fiber. Each variable reactance circuit 32 includes a variable capacitive element that changes the reactance by applied voltage, such as a varactor diode, and a circuit that applies a control voltage to the variable capacitive element.

Figure 4:
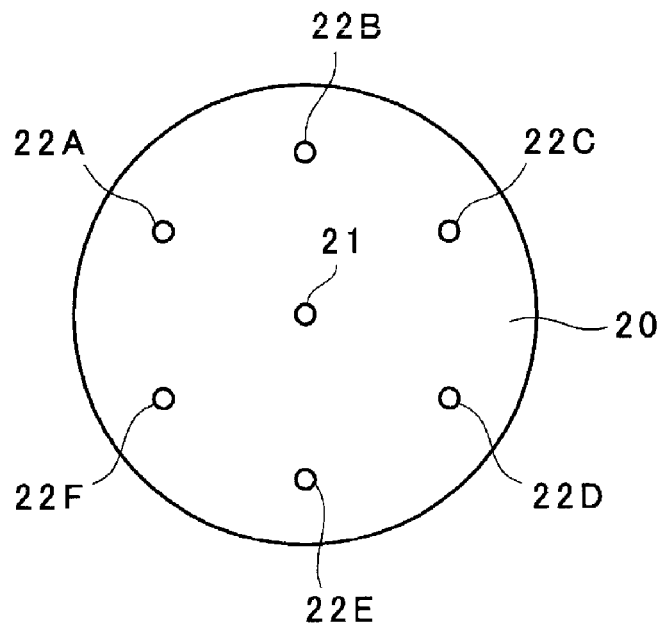
FIG. 4 shows another structure of an antenna of the communication unit.

FIG. 4 is a plan view of a structure of another antenna used in the communication unit 12. In the example shown in FIG. 3A, the four non-power-supplying elements 22A to 22D are provided, whereas, in the example shown in FIG. 4, six non-power-supplying elements 22A to 22F are disposed at equal angles around a power supplying element 21. The other structural features are preferably the same as those in FIGS. 3A and 3B. Even with this structure, it is possible to control reception beam directivity patterns by controlling the reactances of variable reactance circuits 32 provided between the respective non-power-supplying elements 22A to 22F and ground.

Figure 5:
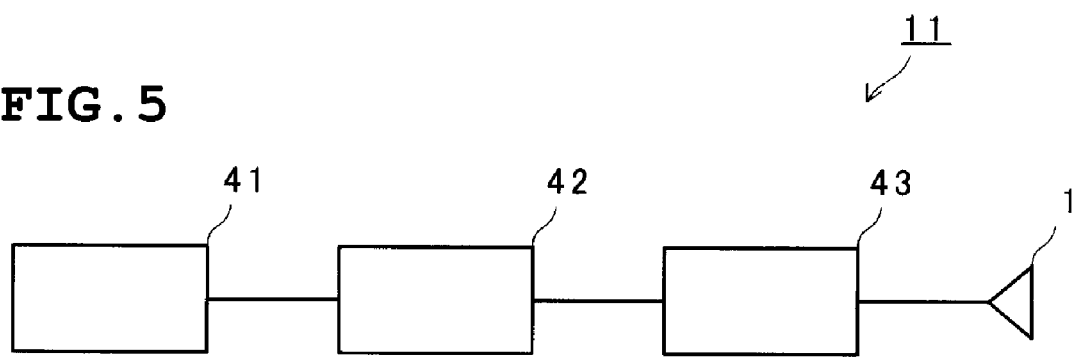
FIG. 5 is a block diagram of a structure of a pneumatic pressure monitoring unit used in the tire pressure monitoring device.

FIG. 5 is a block diagram of a structure of a pneumatic pressure monitoring unit 11. A pressure sensor 41 detects pneumatic pressure in the corresponding tire, and a control circuit 42 measures the pneumatic pressure using the pressure sensor 41. An RF transmission circuit 43 encodes a result of the measurement of the pneumatic pressure and transmits it in a predetermined form by radio from an antenna 1. It is sent in, for example, a megahertz band of 315 MHz, 433 MHz, or 125 MHz, or a gigahertz band of 2.4 GHz.

For the antenna 1 of the pneumatic pressure monitoring unit, a normal monopole antenna or patch antenna is used. However, since the pneumatic pressure monitoring unit is provided so as to be integrated with an air valve of a wheel, the position of the pneumatic pressure monitoring unit changes due to the rotation of the tire. Therefore, the change in strength of an electromagnetic wave that is transmitted to the communication unit provided at substantially the center of the bottom surface of the vehicle tends to be large. As a result, when the directivity of a reception beam of the communication unit is not very acute, the communication unit may receive an electric wave from the pneumatic pressure monitoring unit of a tire other than that from the target tire.

The directivity of the antenna of the pneumatic monitoring unit is determined so that a transmission beam directivity pattern of the antenna of the pneumatic pressure monitoring unit is set inward in the axle direction of the tire. This increases and stabilizes a reception gain of the communication unit regardless of the rotation of the tire.

Figure 6:
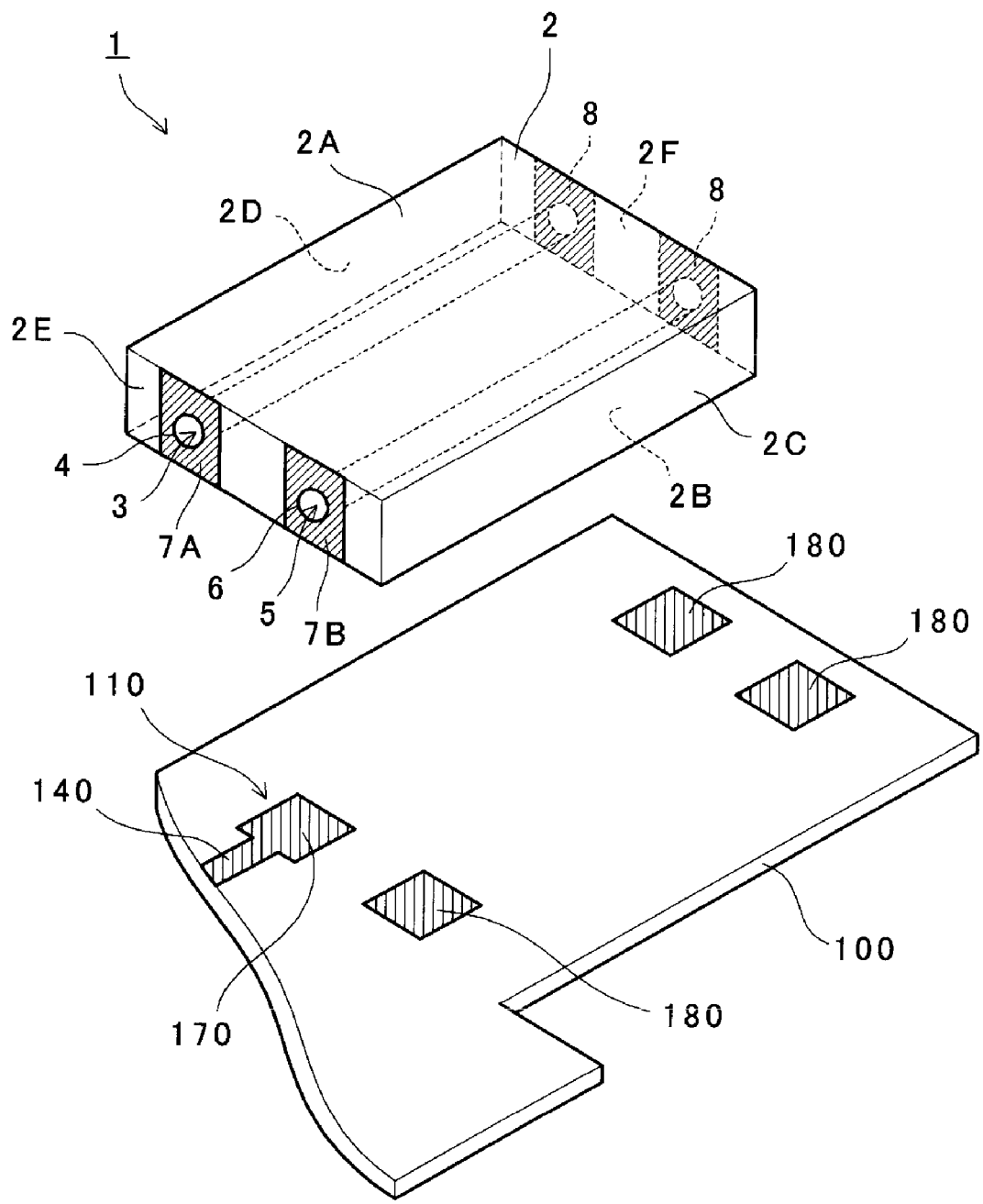
FIG. 6 shows a structure of an antenna of the tire pressure monitoring device.

FIG. 6 is an exploded perspective view of the structure of an antenna of a pneumatic pressure monitoring unit, the antenna having such a transmission beam directivity pattern. An antenna 1 is a surface mount antenna, in which a power supply through hole 3 and a non-power-supply through hole 5, arranged substantially parallel to the power supply through hole 3, are provided from an end surface 2E to an end surface 2F in a dielectric substrate 2 made of, for example, ceramic, polypropylene resin, polybutylene terephthalate resin, or polycarbonate resin. A radiating electrode 4, formed of Cu, Ag, Ag—Pd, or Ag—Pt, is formed by, for example, electroplating or applying a conductive paste on an inner peripheral surface defining the power supply through hole 3. Similarly, a non-power-supply electrode 6 is formed on an inner surface to define the non-power-supply through hole 5.

End electrodes 7A and 7B are provided on the end surface 2E of the dielectric substrate 2 so as to be positioned around the power supply through hole 3 and the non-power-supply through hole 5, respectively.

The end electrode 7A is connected to the radiating electrode 4 that is formed at an inner peripheral surface defining the power supply through hole 3, and the end electrode 7B is connected to the non-power-supply electrode 6 that is formed at an inner peripheral surface defining the non-power-supply through hole 5. To increase the securing strength to the substrate (described later), the end electrodes 7A and 7B extend from the end surface 2E to a bottom surface 2B of the dielectric substrate 2.

Fixed electrodes 8 are provided on the end surface 2F of the dielectric substrate 2 so as to be positioned symmetrically with respect to the end electrodes 7A and 7B. The positions, configurations, and number of the fixed electrodes 8 are not particularly limited, and may be selected as appropriate in accordance with the required fixing strength or manufacturing costs. For example, only one fixed electrode 8 may be provided on the end surface 2F, or fixed electrodes 8 may be provided on side surfaces 2C and 2D, or fixed electrodes 8 may be provided from the end surface 2F, the side surface 2C, or the side surface 2B to the bottom surface 2B. However, considering the fixing strength with respect to external shock, it is preferable that the electrodes that are provided on the outer surface of the dielectric substrate be arranged symmetrically as a whole.

In FIG. 6, a power supply portion 110, securing conductors 180, and a power supply path 140 are provided on a mounting base 100. The power supply portion 110 includes a power supply conductor 170, and is connected to the power supply path 140.

The end electrodes 7A and 7B, provided on the end surface 2E of the dielectric substrate 2 and the fixed electrodes 8 provided on the end surface 2F of the dielectric substrate 2 are arranged so as to correspond to the power supply conductor 170 and the securing conductors 180, respectively, to connect and secure them to each other with, for example, solder or an adhesive.

When the antenna 1 is connected and secured to the base 100, electrical power is supplied to the antenna 1 as a result of supplying the electrical power from a power supply (not shown) to the radiating electrode 4 through the power supply path 140, the power supply conductor 170, and the end electrode 7A. By supplying the electrical power to the radiating electrode 4, a high-frequency electromagnetic field is generated and electrical current flows from the end surface 2E to the end surface 2F of the dielectric substrate 2.

Electrical current also flows to the non-power-supply electrode 6, which is provided on the inner peripheral surface defining the non-power-supply through hole 5, as a result of coupling between the end electrodes 7A and 7B. However, the distribution differs from that of the electrical current flowing to the power supply through hole 3. In addition, the direction in which the electrical current flows to the non-power-supply through hole 5 differs due to a difference in the degree of coupling resulting from the disposition of the power supply through hole 3 and the non-power-supply through hole 5 in the dielectric substrate 2 and the strength of the coupling between the end electrodes 7A and 7B.

Therefore, the directivity of an electric wave that is radiated from the radiating electrode 4 can be set from the power supply through hole 3 to the non-power-supply through hole 5 or from the non-power-supply through hole 5 to the power supply through hole 3 by adjusting the difference between the magnitude of the phase and a reactance component of the electrical current flowing to the non-power-supply electrode 6. The directivity is set inward in the axle direction of a tire.

Accordingly, as mentioned above, it is possible to increase and stabilize the reception gain of the communication unit regardless of the rotation of a tire.

Figure 7:
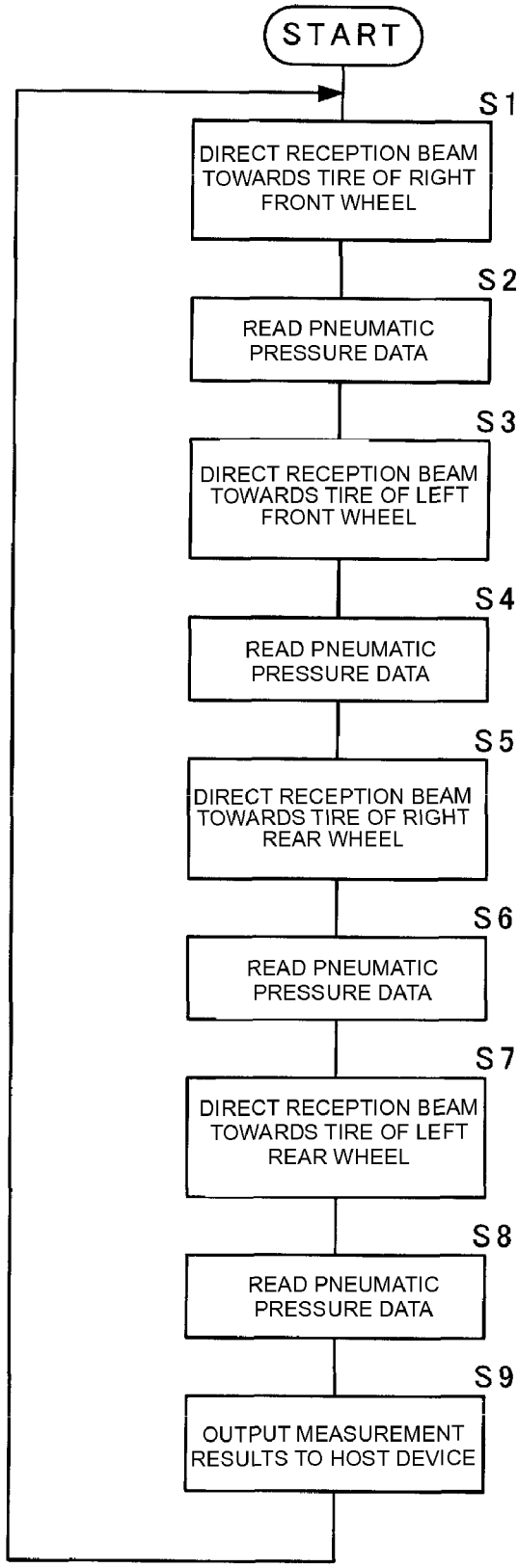
FIG. 7 is a flowchart of operational steps of a processor of the communication unit.

FIG. 7 is a flowchart of operational steps of the processor 123 of the communication unit 12 shown in FIG. 2. First, a reception beam is directed towards the tire 10A of the right front wheel. In other words, a reception beam directivity pattern is controlled so as to become the reception beam directivity pattern BRA shown in FIG. 1 (Step S1). In this state, the receiver 122 shown in FIG. 2 receives a radio signal from the pneumatic pressure monitoring unit 11A that is provided at the tire 10A of the right front wheel. Then, the processor 123 reads pneumatic pressure data transmitted from the receiver 122 (Step S2). This provides the pneumatic pressure information of the tire of the right front wheel. Next, a reception beam is directed towards the tire 10B of the left front wheel. In other words, a reception beam directivity pattern is controlled so as to become the pattern represented by BRB (Step S3). In this state, the receiver 122 receives a radio signal from the pneumatic pressure monitoring unit 11B that is provided at the tire 10B of the left front wheel. Then, the processor 123 reads pneumatic pressure data from the receiver 122 (Step S4). Next, a reception beam is directed towards the tire 10C of the right rear wheel. In other words, a reception beam directivity pattern is controlled so as to become the pattern represented by BRC (Step S5). In this state, the receiver 122 receives a radio signal from the pneumatic pressure monitoring unit 11C that is provided at the tire 10C of the right rear wheel. Then, the processor 123 reads pneumatic pressure data from the receiver 122 (Step S6). Next, similarly, a reception beam is directed towards the tire 10D of the left rear wheel. In other words, a reception beam directivity pattern is controlled so as to become the pattern represented by BRD (Step S7). In this state, the receiver 122 receives a radio signal from the pneumatic pressure monitoring unit 11D that is provided at the tire 10D of the left front wheel. Then, the processor 123 reads pneumatic pressure data from the receiver 122 (Step S8).

Thereafter, the pneumatic pressure information of each tire is output to the host device (Step S9). The aforementioned operations are repeated to monitor the pneumatic pressure of each tire at desired time intervals.

Next, a tire pressure monitoring device according to a second preferred embodiment will be described with reference to FIGS. 8 to 11.

The tire pressure monitoring device according to this preferred embodiment differs from the tire pressure monitoring device according to the first preferred embodiment as follows.

First, a communication unit and each pneumatic pressure monitoring unit have a transmission function and a reception function. Second, only when a signal for measuring pneumatic pressure of a tire is transmitted from the communication unit to the corresponding pneumatic pressure monitoring unit is the pneumatic pressure of the tire measured at the pneumatic pressure monitoring unit, and pneumatic pressure data thereof transmitted to the communication unit. Third, using a power supply technology of a remote card IC of an RFID (Radio Frequency Identification) system, a secondary battery, which is a power supply of a pneumatic pressure monitoring unit, is charged with electrical power of the signal (electric wave) received by the pneumatic pressure monitoring unit to drive the pneumatic pressure monitoring unit.

Figure 8:
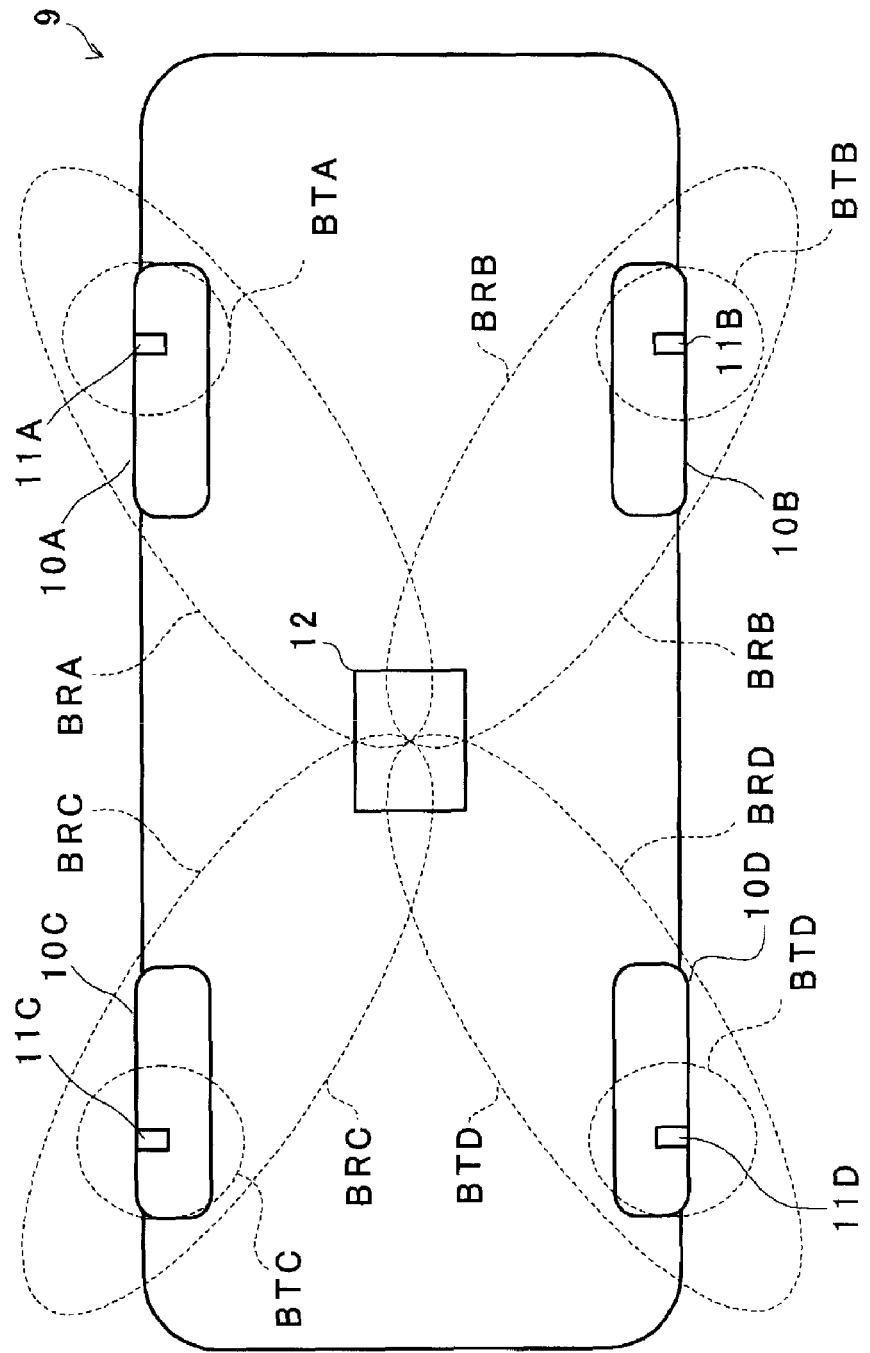
FIG. 8 is a schematic bottom view of a vehicle in which a tire pressure monitoring device according to a second preferred embodiment of the present invention is installed.

FIG. 8 is a schematic bottom view of a vehicle 9 in which the tire pressure monitoring device according to this preferred embodiment is installed.

Each of the pneumatic pressure monitoring units 11A to 11D use the same antenna for transmitting and receiving a signal. Accordingly, transmission beams and reception beams of the pneumatic pressure monitoring units 11A to 11D have substantially the same directivity. The reception beams and the transmission beams of the pneumatic pressure monitoring units 11A to 11D have the directivities as indicated by BTA to BTD shown in FIG. 8.

A communication unit 12 also performs transmission and reception of signals with respect to the tires via one antenna. Accordingly, transmission beams and reception beams of the communication unit 12 also have substantially the same directivity. The reception beams and the transmission beams of the communication unit 12 have the directivities as indicated by BRA to BRD shown in FIG. 8.

Here, the communication unit 12 preferably uses an antenna that has a structure that is substantially the same as that of the antenna of the communication unit in the first preferred embodiment of the present invention. Each of the pneumatic pressure monitoring units 11A to 11D preferably use a monopole antenna, and their directivities that are represented by BTA to BTD are substantially circular.

Figure 9:
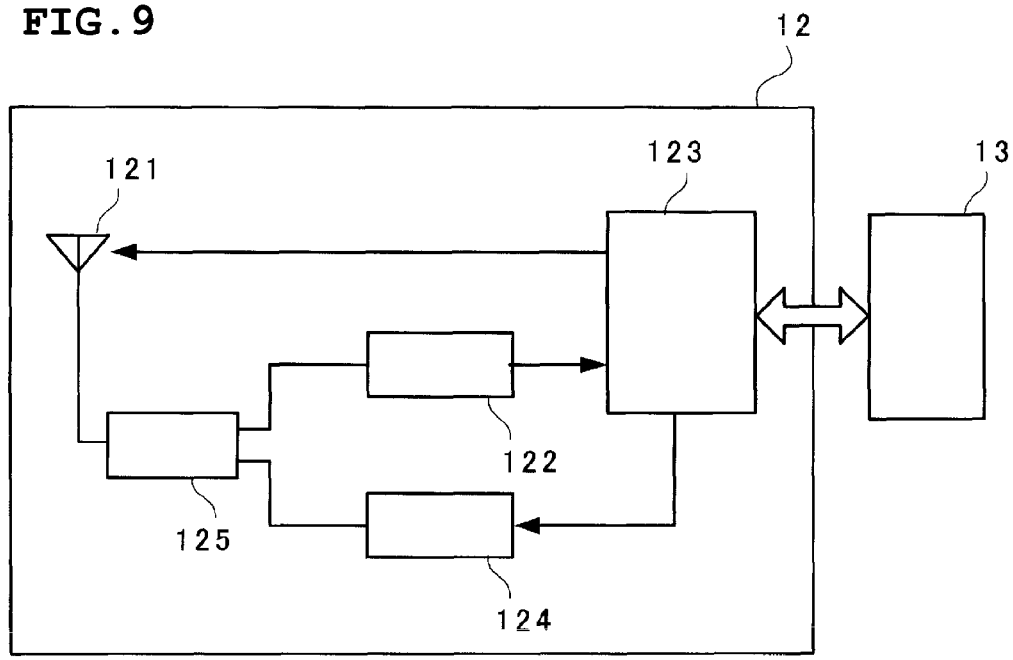
FIG. 9 is a block diagram of a structure of a communication unit of the tire pressure monitoring device.

FIG. 9 is a block diagram showing a relationship between the communication unit 12 and a host device 13 connected to the communication unit 12 according to this preferred embodiment.

A high-frequency switch 125 switches a state of connection between a transmitter 124 or a receiver 122 and an antenna 121. The transmitter 124 transmits, through the high-frequency switch 125 and the antenna 121, a radio signal that gives an instruction for measuring pneumatic pressure of a tire. The receiver 124 reads pneumatic pressure data of the tire from the radio signal received through the antenna 121 and the high-frequency switch 125. A processor 123 sets the directivity of the antenna 121 and controls the transmitter 124, the receiver 122, and the high-frequency switch 125.

First, the communication unit 12 sets the high-frequency switch 125 in a transmission mode state and connects the antenna 121 and the transmitter 124 to each other. Then, the processor 123 determines and sets the directivity of the antenna 121. Here, it is assumed that the tire 10A is specified by the processor 123.

Next, the communication unit 12 sets the directivity of the antenna 121 to the transmission beam (BRA) in the direction of the tire 10A. This makes it possible for the pneumatic pressure monitoring unit 11A that is provided at the tire 10A to selectively receive the radio signal from the communication unit 12.

Next, the communication unit 12 sends the radio signal that gives an instruction for measuring pneumatic pressure, from the transmitter 124 through the antenna 121 using the transmission beam (BRA). Here, the radio signal is transmitted as a microwave having high directivity. Accordingly, in the pneumatic pressure monitoring unit 11A, energy of the radio signal is used as electrical power, and the pneumatic pressure of the tire 10A is measured to transmit the pneumatic pressure data.

Next, in the communication unit 12, after transmitting the radio signal, the high-frequency switch 125 is set to a reception mode state, and the antenna 121 and the receiver 122 are connected to each other. This makes it possible to selectively receive the radio signal from the pneumatic pressure monitoring unit 11A by using the reception beam (BRA) that is directed in the direction of the tire 10A.

Therefore, the communication unit 12 can consistently receive the pneumatic pressure data that is transmitted from the pneumatic pressure monitoring unit 11A.

Figure 10:
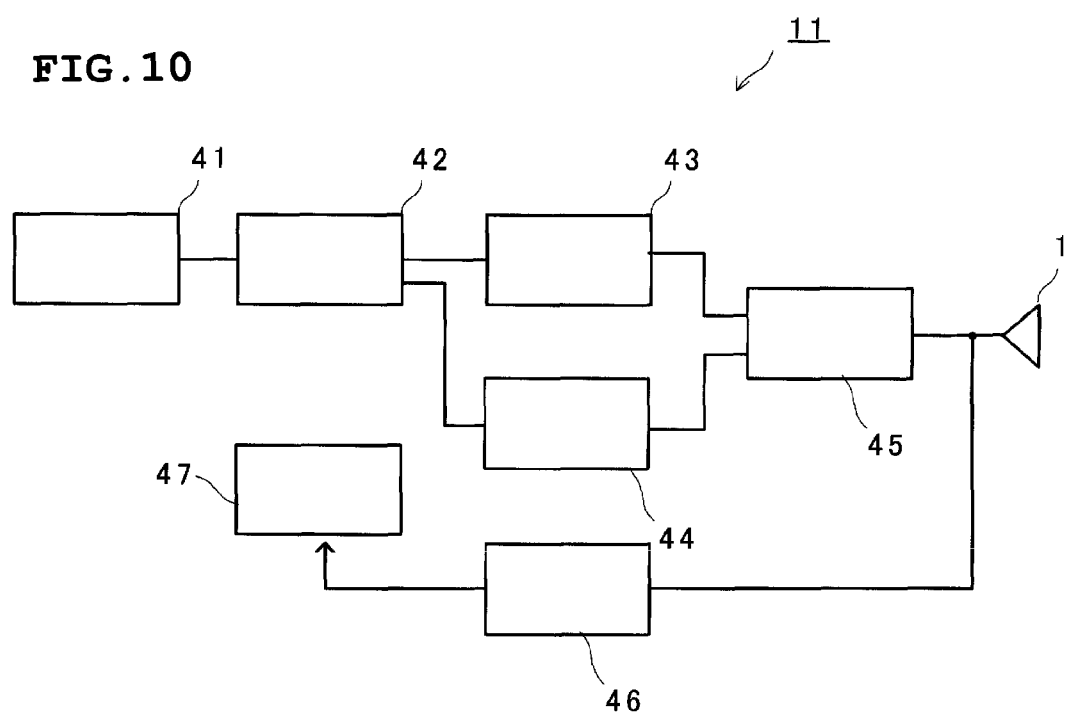
FIG. 10 is a block diagram of a structure of a pneumatic pressure monitoring unit in the tire pressure monitoring device.

FIG. 10 is a block diagram of a structure of a pneumatic pressure monitoring unit 11 in this preferred embodiment.

Here, a pressure sensor 41 detects pneumatic pressure in a tire. A controlling circuit 42 measures the pneumatic pressure with the pressure sensor 41. An RF transmission circuit 43 encodes a result of the measurement of the pneumatic pressure in accordance with a predetermined form, and transmits the encoded result from an antenna 1 through a high-frequency switch 45. An RF reception circuit 44 receives, through the antenna 1 and the high-frequency switch 45, a radio signal transmitted from the communication unit 12 having the predetermined form, and gives an instruction for measuring the pneumatic pressure of the tire. A power converting circuit 46 charges a capacitor with the energy of the received radio signal, and the electrical power with which the capacitor is charged is used to charge a secondary battery 47, which is a power supply. Reception beams and transmission beams of antennas 1 have directivities that are represented by the aforementioned BTA to BTD. The radio communication is performed in, for example, a megahertz band of 315 MHz, 433 MHz, or 125 MHz, or a gigahertz band of 2.4 GHz.

In the pneumatic pressure monitoring unit 11, in its ordinary state, the high-frequency switch 45 is set in a reception mode, and the antenna 1 and the RF reception circuit 44 are connected to each other. In this state, when it receives, from the communication unit 12, the radio signal that gives an instruction for measuring the pneumatic pressure of the tire, the controlling circuit 42 measures the pneumatic pressure of the tire with the pressure sensor 41, and the power converting circuit 46 charges the secondary battery 47 by using the energy of the radio signal. Next, to transmit pneumatic pressure data of the tire to the communication unit 11, the pneumatic pressure monitoring unit sets the high-frequency switch 45 in a transmission mode, and the antenna 1 and the RF transmission circuit 43 are connected to each other. Then, a radio signal of the pneumatic pressure data of the tire is transmitted from the antenna 1 to the communication unit 12. After the transmission, the high-frequency switch 45 is set again to the reception mode and returns to its ordinary state.

Therefore, the pneumatic pressure monitoring unit 11 can consistently receive the instruction for measuring the pneumatic pressure that is transmitted from the communication unit 12. Since the pneumatic pressure is measured and the pneumatic pressure data is transmitted only when the instruction is received, the power consumption of the pneumatic pressure monitoring unit 11 is reduced.

In addition, since the secondary battery 47 of the pneumatic pressure monitoring unit is charged, the pneumatic pressure monitoring unit 11 increases the life of the power supply of the pneumatic pressure monitoring unit 11, and can be used until the end of the life of the tire without replacing the secondary battery 47.

Further, as in this preferred embodiment, when the pneumatic pressure of the tire is measured after the pneumatic monitoring unit 11 receives a signal from the communication unit 12, and, then, the pneumatic pressure data is transmitted to the communication unit 12, only one pneumatic pressure monitoring unit 11 is in a state of transmitting a transmission signal. Therefore, the directivity required of the antenna 1 of the pneumatic monitoring unit 11 is such that the directivity towards the communication unit 12 allows the use of a transmission power level that can be received by the communication unit 12. Accordingly, the transmission power level of the pneumatic pressure monitoring unit 11 can be restricted for use.

Further, to restrict the transmission power level of the pneumatic pressure monitoring unit 11, the antenna 1 of the pneumatic pressure monitoring unit 11 may be a small antenna, such as a patch antenna or a loop antenna, in addition to the monopole antenna in the preferred embodiment. Any type of antenna may be used as long as the antenna has a transmission power level that can be received by the communication unit 12.

Figure 11:
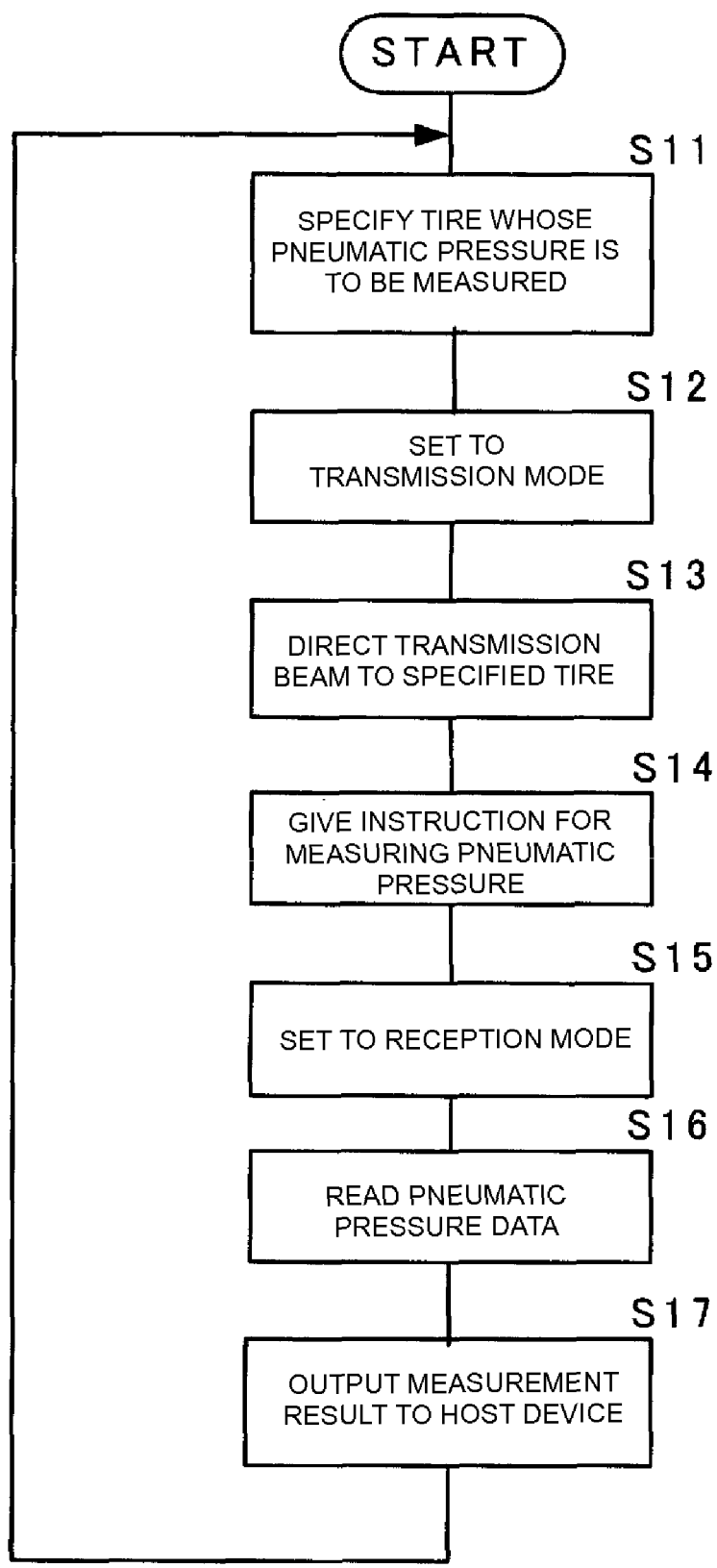
FIG. 11 is a flowchart of operational steps of a processor of the communication unit.

FIG. 11 is a flowchart of operational steps of the processor 123 of the communication unit 12 shown in FIG. 9.

First, the processor 123 of the communication unit 12 specifies which tire pneumatic pressure is to be measured. In other words, it specifies which tire is to be measured based on previously programmed data. Alternatively, an instruction regarding a determination made by a driver may be provided from the host device 13 to specify which tire is to be measured based on the instruction (Step S11).

The processor 123 of the communication unit 12 sets the high-frequency switch in a transmission mode and connects the antenna to the transmitter (Step S12).

Next, to direct a transmission beam towards the specified tire, power supply to the antenna is controlled. For example, when the tire 10A of the right front wheel is to be measured, the transmission beam BRA that is directed towards the tire 10A is set for the directivity of the antenna (Step S13).

Next, the processor 123 outputs a signal that provides an instruction for measuring the pneumatic pressure. By this, the transmitter 124 outputs an instruction signal, so that a radio signal that is directed in the direction of the specified tire is transmitted from the antenna 121 (Step S14).

Next, the processor 123 sets the high-frequency switch in a reception mode and connects the antenna and the receiver to each other (Step S15).

Next, pneumatic pressure data is read from a radio signal that is received by the receiver 122 and that is of the pneumatic pressure data transmitted from the pneumatic pressure measuring unit of the tire (Step S16).

Then, the pneumatic pressure data of the tire is output to the host device (Step S17).

The aforementioned steps are repeated to measure the pneumatic pressures of the tires of all four wheels. It is possible to automatically measure the pneumatic pressures by previously programming of a processor, for example, the order in which the pneumatic pressures of the specified tires are measured and the period of measurements of the tires of the four wheels.

Since the processor performs the processing operations of these steps, even if the tires of the four wheels are to be periodically measured when the vehicle is traveling, the measurement period is easily set long or short. If the measurement period is set long, it is possible to reduce the number of signal transmissions of the pneumatic pressure monitoring units. Therefore, it is possible to restrict power consumption of the pneumatic pressure monitoring units.

When the monitoring device is set so that the pneumatic pressure is measured only when an instruction is given by the driver when, for example, the vehicle is stopped, it is possible to reduce the number of signal transmissions of the pneumatic pressure monitoring units. This makes enables the power consumption of the pneumatic pressure monitoring units to be very small.

As mentioned above, according to this preferred embodiment, the power consumption of the pneumatic pressure monitoring units is reduced, and the life of the power supplies of the pneumatic pressure monitoring units is increased.

To charge each secondary battery using the power converting circuit, it is not necessary to charge each capacitor as is in the foregoing description. Instead, a secondary battery for each pneumatic pressure monitoring unit may be charged directly by electromagnetic induction or with microwaves. In addition, instead of using energy from radio signals from the communication unit, energy of electrical power carrier waves that are transmitted from a signal source other than the communication unit as a result of using power supply technology of a proximity/vicinity/remote IC card (used in the aforementioned RFID system) may be used.

Next, a tire pressure monitoring device according to a third preferred embodiment will be described with reference to FIGS. 12 and 13.

Figure 12:
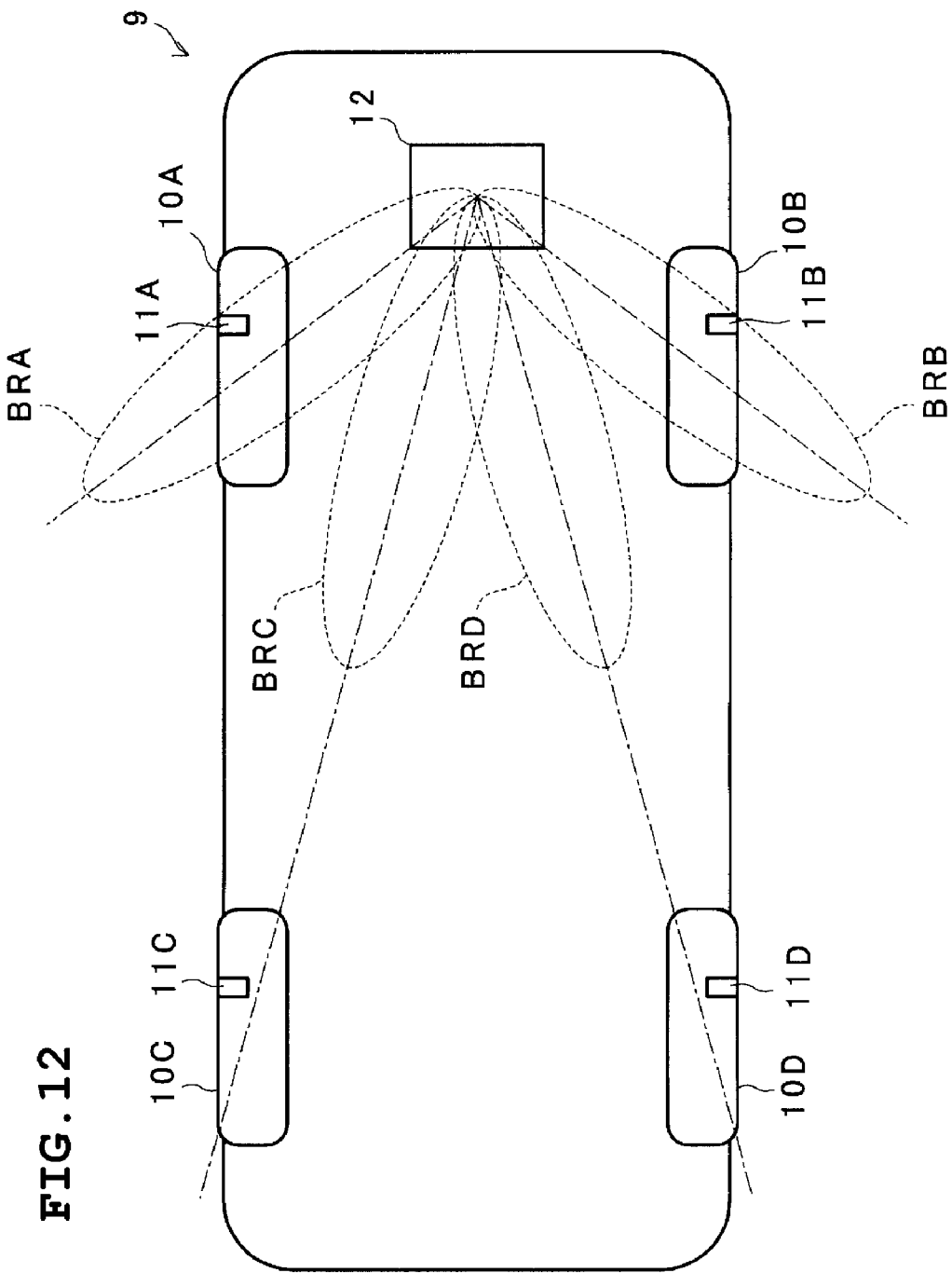
FIG. 12 is a schematic bottom view of a vehicle in which a tire pressure monitoring device according to a third preferred embodiment of the present invention is installed.

FIG. 12 is a schematic bottom view of a vehicle 9 in which the tire pressure monitoring device is installed. In the first preferred embodiment, the directivity patterns of the reception beams are preferably generated in four directions at approximately 90-degree intervals with the antenna of the communication unit 12 disposed at center. In the third preferred embodiment, as shown in FIG. 12, directivity patterns of reception beams are in four directions at an angle interval (such as 30 degrees) that is less than the angle interval of approximately 90 degrees with a communication unit 12 disposed at a center. In other words, the directivity pattern of the reception beam is provided in a direction represented by BRA, so that a radio signal that is transmitted from a pneumatic pressure monitoring unit 11A provided at a tire 10A of a right front wheel is received. In addition, the directivity pattern of the reception beam is provided in a direction represented by BRB, so that a radio signal that is transmitted from a pneumatic pressure monitoring unit 11B provided at a tire 10B of a left front wheel is received. Further, the directivity pattern of the reception beam is provided in a direction represented by BRC, so that a radio signal that is transmitted from a pneumatic pressure monitoring unit 11C provided at a tire 10C of a right rear wheel is received. Similarly, the directivity pattern of the reception beam is provided in a direction represented by BRD, so that a radio signal that is transmitted from a pneumatic pressure monitoring unit 11B provided at a tire 10D of a left rear wheel is received.

Figure 13:
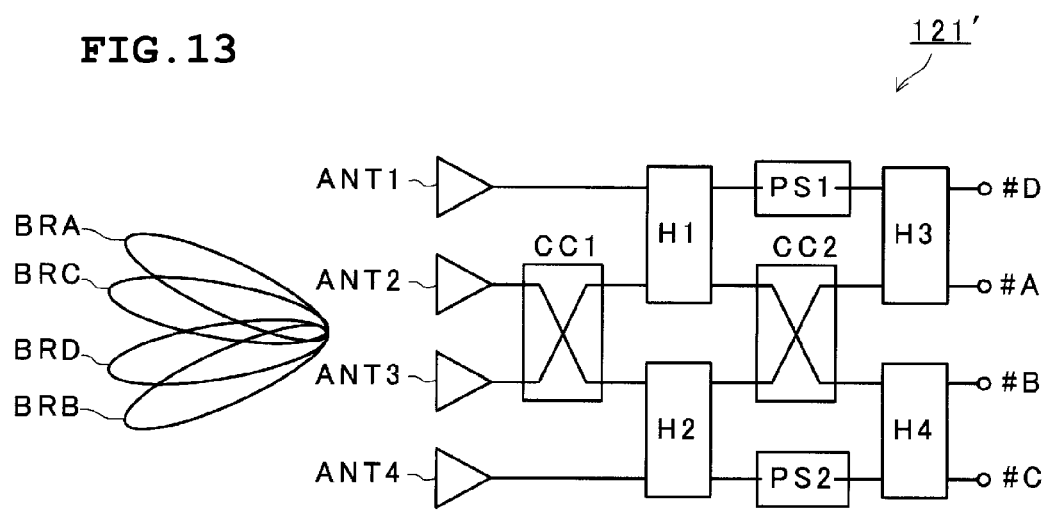
FIG. 13 is a block diagram of a structure of an antenna of the communication unit of the tire pressure monitoring device.

FIG. 13 is a block diagram of a structure of an antenna 121' of the communication unit 12 shown in FIG. 12. In this example, what is called a Butler Matrix is provided by four hybrid circuits H1 to H4, two cross couplers CC1 and CC2, and two phase shift circuits PS1 and PS2. The Butler Matrix and four element antennas ANT1 to ANT4 define an electronic scanning antenna.

In the Butler Matrix, even if electrical power is input from any of four input ports (input portions from the element antennas ANT1 to ANT4), the electrical power is uniformly distributed to the output ports. However, the tilting of phases of the output portions depends upon from which input port a signal is input. Here, the phase shift circuits PS1 and PS2 cause the phases to lag by approximately 45 degrees. At an output port #A, a reception signal having the directivity pattern of the reception beam represented by BRA is obtained, and, at an output port #B, a reception signal having the directivity pattern of the reception beam represented by BRB is obtained. In addition, at an output port #C, a reception signal having the directivity pattern of the reception beam represented by BRC is obtained, and, at an output port #D, a reception signal having the directivity pattern of the reception beam represented by BRD is obtained. Accordingly, it is possible to selectively receive radio signals from the pneumatic pressure monitoring units of the tires in four directions from the four input ports #A to #D.

A communication unit used in a tire pressure monitoring device according to a fourth preferred embodiment will be described with reference to FIG. 14.

In the third preferred embodiment, as shown in FIG. 12, the communication unit 12 is disposed in front of the tires 10A and 110 of the front wheels, and the signals are received by the electronic scanning antenna including a single Butler Matrix. In the fourth preferred embodiment, as in the preferred embodiment shown in FIG. 1, a communication unit is disposed substantially at the center near the bottom surface of a vehicle. In addition, a unit that controls directivity patterns of reception beams for two tires of the front wheels and a unit that provides directivity patterns of reception beams for two tires of the rear wheels are separately provided.

Figure 14:
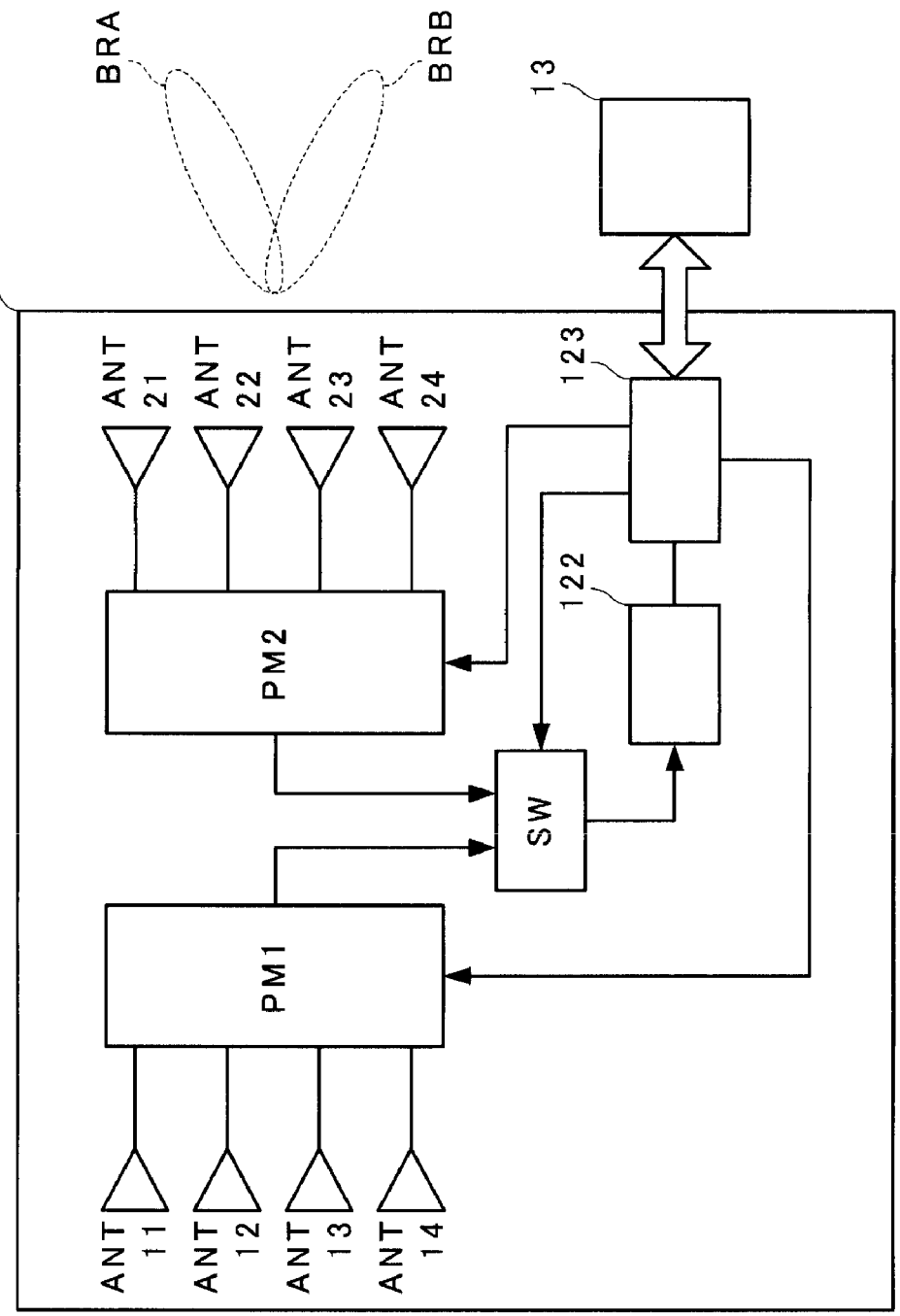
FIG. 14 is a block diagram of a structure of a communication unit of a tire pressure monitoring device according to a fourth preferred embodiment of the present invention.
Figure 15:
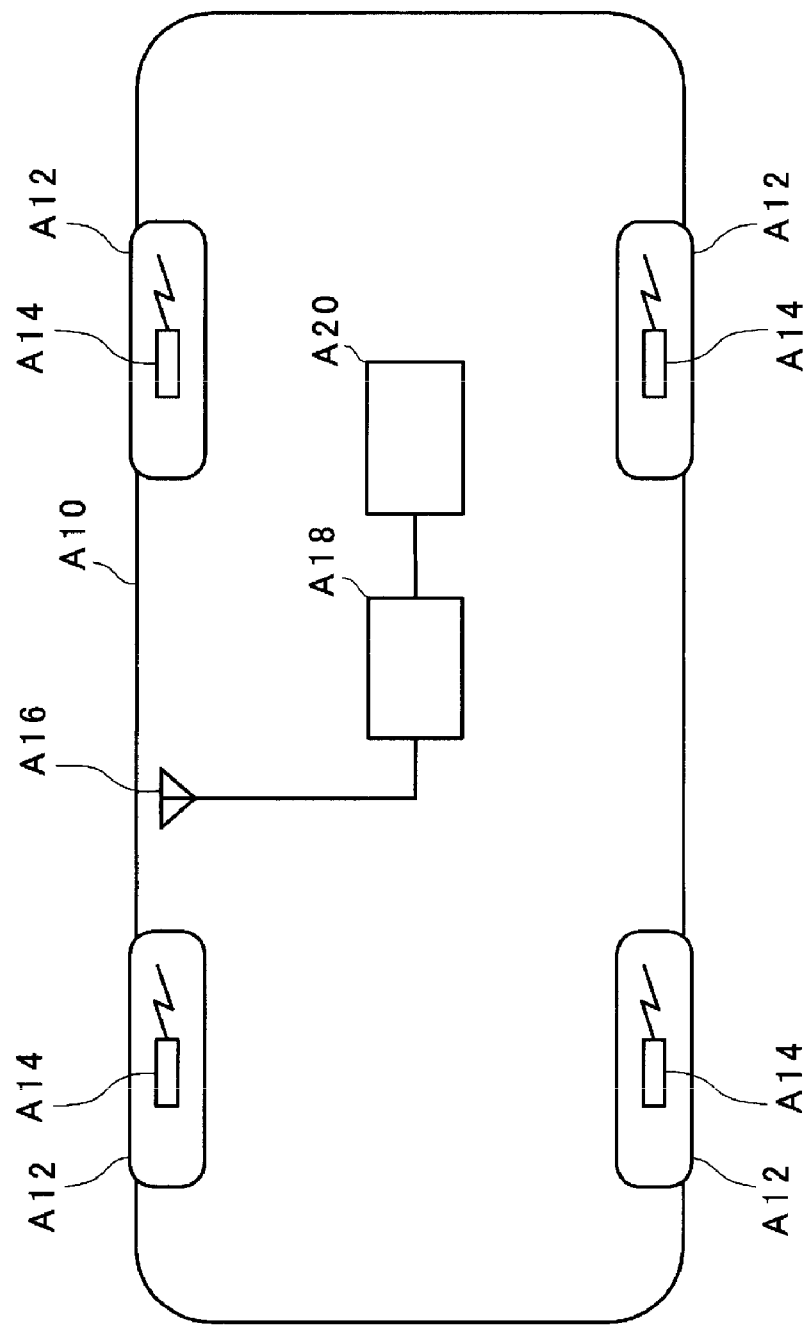
FIG. 15 is a block diagram of a structure of a tire pressure monitoring device disclosed in Patent Document 1.
Figure 16:
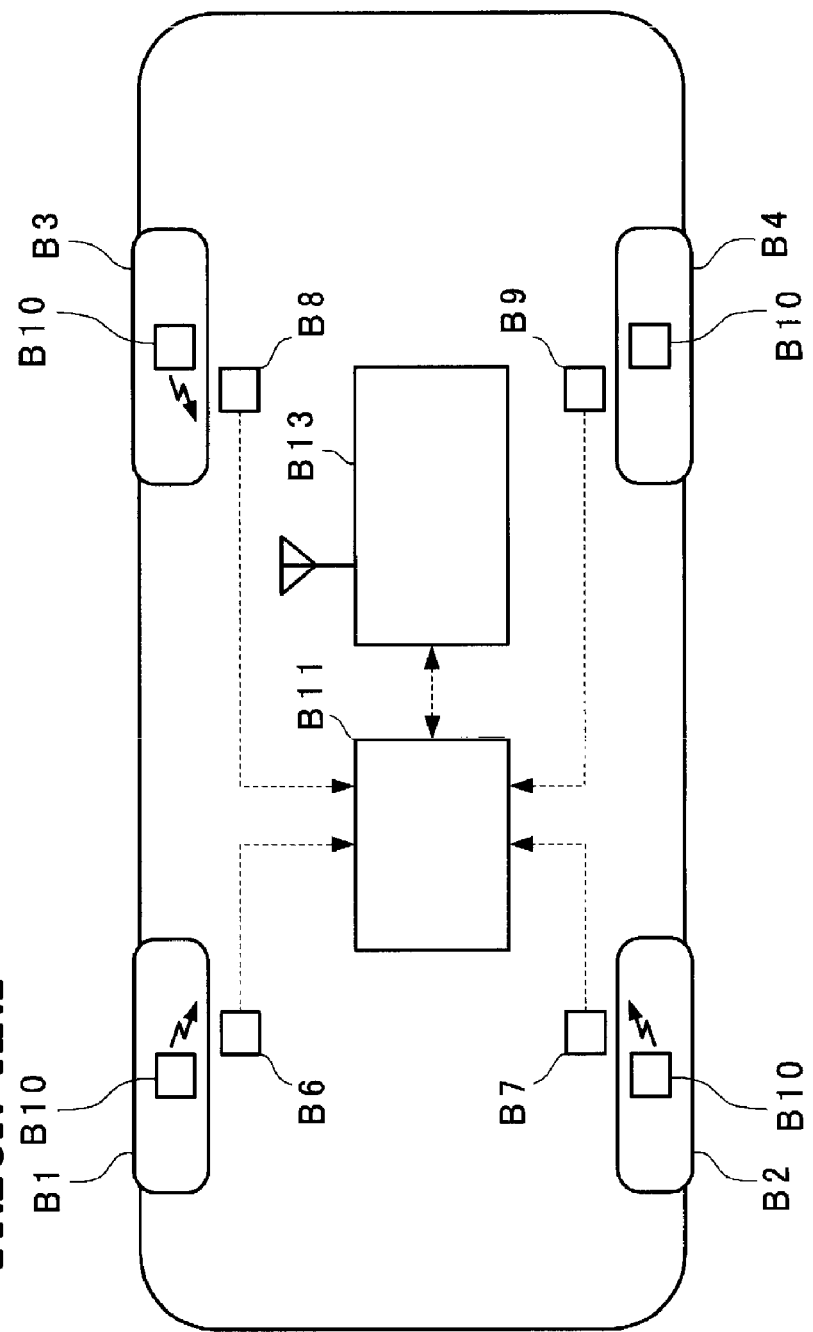
FIG. 16 is a block diagram of a structure of a tire pressure monitoring device disclosed in Patent Document 2.

FIG. 14 is a block diagram of the communication unit. In FIG. 14, PM1 and PM2 denote phase synthesizers. The phase synthesizer PM1 provides reception beams of two directions represented by BRC and BRD as a result of phase shifting input signals from four element antennas ANT11 to ANT14 by a predetermined phase and by adding them. Similarly, the phase synthesizer PM2 provides reception beams of two directions represented by BRA and BRB as a result of phase shifting input signals from four element antennas ANT21 to ANT24 by a predetermined phase and by adding them.

A switch circuit SW selects one of the outputs from the phase synthesizers PM1 and PM2. A receiver 122 receives a signal from the switch SW. A processor 123 provides a phase-shift-amount control signal to the phase synthesizer PM1 to provide the reception beams represented by BRC and BRD. Similarly, it provides a phase-shift-amount control signal to the phase synthesizer PM2 to provide the reception beams represented by BRA and BRB. A switching signal is provided to the switch SW. Therefore, the processor 123 selectively receives an electric wave from the desired tire pressure monitoring device based on any one of the reception beams represented by BRA to BRD. The processor 123 transmits data to and receives data from a host device 13.

The power supply of each pneumatic monitoring unit may be a primary battery. Other than using a primary battery, it is possible to receive an electrical power carrier wave from outside the tires and generate power supply voltage to drive, for example, the pressure sensors, control circuits, RF transmission circuits, RF reception circuits, and high-frequency switches of the pneumatic monitoring units by using the power supply voltage.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A tire pressure monitoring device comprising:
    pneumatic pressure monitoring units disposed at respective tires of a vehicle, including antennas, and arranged to measure pneumatic pressures of the tires and transmit results of the measurements of the pneumatic pressures from the antennas using radio signals; and
    a communication unit arranged to receive the radio signals from the antennas of the pneumatic pressure monitoring units; wherein
    the communication unit includes a single antenna arranged to receive the radio signals from the antennas of the pneumatic pressure monitoring units; and
    the communication unit is disposed in the vehicle, and is provided with a beam controller arranged to selectively set a directivity of the single antenna of the communication unit in directions of the respective tires such that, at any given time, the single antenna is directed at one of the tires, and the single antenna receives the radio signals from the pneumatic pressure monitoring unit disposed at the one of the tires at which the single antenna is directed at the given time; and
    each of the antennas of the pneumatic pressure monitoring units is a directional antenna arranged to transmit signals from the respective tire towards an inside of the vehicle in an axle direction of the respective tire.

2. The tire pressure monitoring device according to claim 1, wherein
    the communication unit is also arranged to transmit radio signals from the single antenna thereof to the pneumatic pressure monitoring units; and
    after selectively setting the directivity of the single antenna of the communication unit towards one of the tires and transmitting a signal to the pneumatic pressure monitoring unit of the one of the tires, the communication unit receives the radio signals that are transmitted from the pneumatic pressure monitoring unit of the one of the tires.

3. The tire pressure monitoring device according to claim 1, wherein each of the pneumatic pressure monitoring units includes a unit arranged to convert an electromagnetic wave into electrical power.

4. The tire pressure monitoring device according to claim 3, wherein the unit arranged to convert an electromagnetic wave into electrical power of each pneumatic pressure monitoring unit converts the radio signals transmitted from the communication unit into electrical power.

5. The tire pressure monitoring device according to claim 1, wherein the communication unit is provided at substantially a center near a bottom surface of the vehicle.

6. The tire pressure monitoring device according to claim 1, wherein the single antenna of the communication unit includes a monopole power-supplying element disposed at a central portion of a grounded disc-shaped ground conductor, and four monopole non-power-supplying elements disposed around the power-supplying element.

7. The tire pressure monitoring device according to claim 6, wherein the disc-shaped ground conductor includes a disc-shaped portion and a cylindrical portion extending downward from a periphery of the disc-shaped ground conductor.

8. The tire pressure monitoring device according to claim 7, wherein the single antenna of the communication unit further includes a power supply circuit disposed in an interior of the cylindrical portion and connected to the power-supplying element.

9. The tire pressure monitoring device according to claim 6, wherein the single antenna of the communication unit further includes variable reactance circuits respectively disposed between the four non-power-supplying elements and ground.

10. The tire pressure monitoring device according to claim 1, wherein each of the pneumatic pressure monitoring units includes a pressure sensor that detects the pneumatic pressure of a respective one of the tires, and a control circuit that measures the pneumatic pressure.

11. The tire pressure monitoring device according to claim 10, wherein each of the pneumatic pressure monitoring units further includes an RF transmission circuit that encodes a result of the measurement of the pneumatic pressure by the control circuit and provides the result to the single antenna of the communication unit.

* * * * *